3,210,375
ACETALS CONTAINING EPOXIDE GROUPS
Daniel Porret, Basel, Willy Fisch, Binningen, Hans Batzer, Arlesheim, and Otto Ernst, Pfeffingen, Switzerland, assignors to Ciba Limited, Basel, Switzerland, a company of Switzerland
No Drawing. Filed July 10, 1964, Ser. No. 381,884
Claims priority, application Switzerland, Sept. 10, 1959, 78,068/59
3 Claims. (Cl. 260—340.7)

This is a continuation-in-part of our application Ser. No. 54,581, filed September 8, 1960, now Patent No. 3,072,678, issued January 8, 1963.

The present invention provides new acetals which contain at least two epoxide groups and correspond to the formula

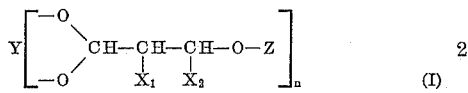   (I)

in which $X_1$ and $X_2$ each represent a hydrogen atom or a methyl group; Z represents an organic radical containing at least one epoxide group; $n$ is a small whole number, and Y represents the radical of a polyhydric alcohol with $2n$ free valences and, when $n=1$, the radical Y must contain at least one epoxide group.

The new acetals are obtained by the present process when:

(A) An acetal, which contains at least one epoxidizable group, of the formula

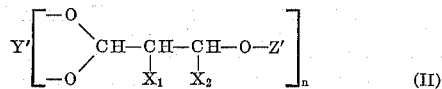   (II)

—in which $X_1$, $X_2$ and $n$ have the same meanings as in Formula I; Z' represents an organic radical which contains at least one epoxide group or an epoxidizable group; and Y' represents the radical of a polyhydric alcohol with $2n$ free valences and, when $n=1$, the radical Y' must contain at least one epoxide group or epoxidizable groups—is treated with an epoxidizing agent; or (B) $n$ Mols of a compound of the formula Z—OH are added on to one mol of an unsaturated acetal of the formula

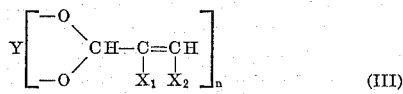   (III)

in which formulae $X_1$, $X_2$, $n$, Z and Y have the same meanings as in Formula I.

The term "radical containing an epoxidizable group" designates above all radicals containing epoxidizable carbon-to-carbon double bonds, such as an allyl, butenyl or tetrahydrobenzyl radical. When acted upon, for example, with an organic per-acid, such carbon-to-carbon double bonds can be epoxidized to yield the 1:2-epoxide group.

The term "radical containing an epoxidizable group" further designates radicals containing a halohydrin grouping

(in which Hal represents a halogen atom), such as a β-methyl-glycerol-α-monochlorohydrin radical or a glycerol α-monochlorohydrin radical. As is known, such a halohydrin group can likewise be converted into a 1:2 epoxide group by treatment with a dehydrohalogenating agent.

The acetals of the Formula II or III to be used as starting materials in the present process are obtained most readily by acetalizing methacrolein or preferably crotonic aldehyde or acrolein with the dialcohol or polyalcohol.

In this connection two cases have to be distinguished:

(1) The polyalcohol used contains as such at least one unsaturated group which can be directly epoxidized in a second stage or after an additive reaction with an alcohol of the formula Z—OH or Z'—OH can be converted into an epoxy compound. In this case there may be used polyalcohols containing at least two hydroxyl groups.

(2) The polyalcohol is free from double bonds, in which case it must contain at least four hydroxyl groups.

In case (1) there may be mentioned as unsaturated polyalcohols, for example:

Butene-(2)-diol-1:4, glycerol monoallyl ether, butanetriol-(1:2:4)-monoallyl ether and the like, furthermore above all dialcohols of the formula

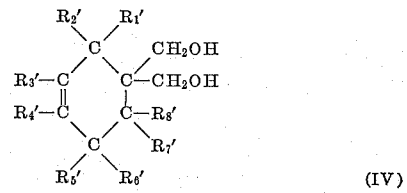   (IV)

in which $R_1'$ to $R_8'$ each represent monovalent substituents, such as halogen atoms, alkoxy groups or aliphatic, cycloaliphatic, araliphatic or aromatic hydrocarbon radicals, more especially alkyl radicals with 1 to 4 carbon atoms, or hydrogen atoms, wherein $R_1'$ and $R_5'$ together may also represent an alkylene radical, such as a methylene group. As examples of such dialcohols IV there may be mentioned:

1:1-bis-[hydroxymethyl] - cyclohexene - (3), 1:1 - bis-[hydroxymethyl]-6-methylcyclohexene-(3), 1:1-bis - [hydroxymethyl]-2:4:6-trimethylcyclohexne - (3), 1:1 - bis-[hydroxymethyl]-2:5-endomethylene - cyclohexene - (3) and 1:1-bis-[hydroxymethyl]-4-chlorocyclohexene-(3).

In case (2) there may be mentioned as polyalcohols containing at least four hydroxyl groups the following:

Erythritol, xylitol, arabitol, sorbitol, mannitol, dulcitol, talitol, iditol, adonitol and pentaerythritol, heptitols, 2:2:6:6 - tetramethylolcyclohexanol - (1); also polyalcohols that additionally contain other functional groups, for example sugars, such as glucose, galactose, mannose, fructose, sucrose and the like; sugar acids such as glucoronic acid, galacturonic acid, mucic acid and the like. Finally, there may be used as polyalcohol a polymer containing free hydroxyl groups, such as a polysaccharide and more especially polyvinyl alcohol or partially hydrolysed polyvinyl acetate. The acetalization may follow the usual pattern and consists for example, in heating an aldehyde of the formula

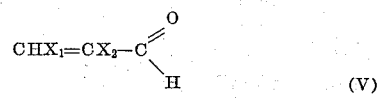   (V)

together with the diol or polyol in the presence of an acid catalyst, such, for example, as hydrochloric or para-toluenesulfonic acid.

This procedure yields at first an unsaturated acetal of the formula

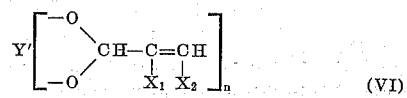   (VI)

To obtain the acetals of the Formula II an alcohol of the formula Z'—OH is added in a second stage on to the double bond of the unsaturated acetal IV. As a rule, the alcohol Z'—OH contains an epoxidizable group. There may be mentioned chlorohydrin, for example α-methylglycerol-α-monochlorohydrin, β-methylglycerol- α-monochlorohydrin, glycerol-β-monochlorohydrin, glycerol-α-bromohydrin and more especially glycerol-α-monochlorohydrin as well as mixtures of such monochlorohydrins, for example the commercial mixture of glycerol-β-monochlorohydrin and glycerol-α-monochlorohydrin; furthermore unsaturated alcohols such as allyl alcohol, crotyl alcohol, octadecenyl alcohol, $\Delta^3$-cyclohexanol-1, dehydronorborneol, dihydrodicyclopentadienol-8 and more especially those of the formula

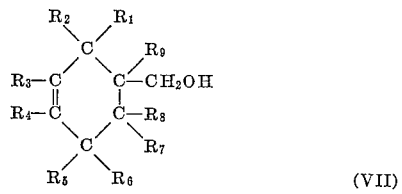

(VII)

in which $R_1$ to $R_9$ each represent monovalent substituents such as halogen atoms, alkoxy groups or aliphatic, cycloaliphatic, araliphatic or aromatic hydrocarbon radicals, more especially lower alkyl groups containing 1 to 4 carbon atoms, or hydrogen atoms, in which formula $R_1$ and $R_5$ together may also constitute an alkylene radical such as a methylene group. As examples of such alcohols VII there may be mentioned: $\Delta^3$-tetrahydrobenzyl alcohol, 6-methyl-$\Delta^3$-tetrahydrobenzyl alcohol, 2:4:6-trimethyl-$\Delta^3$-tetrahydrobenzyl alcohol, 1:5-endomethylene-$\Delta^3$-tetrahydrobenzyl alcohol and 4-chloro-$\Delta^3$-tetrahydrobenzyl alcohol.

When the unsaturated acetal VI is derived from an unsaturated polyol ($n$ in Formula VI is preferably=1), $x$ mols ($x$=not a whole number) of such an acetal can be added on to 1 mol of a polyhydroxy compound containing $x$ hydroxyl groups.

As such polyhydroxy compounds there are suitable above all aliphatic or cycloaliphatic diols or polyols such as ethylene glycol, diethylene glycol, triethylene glycol, polyethylene glycols, propanediol, polypropyleneglycols, butanediol, pentanediol, hexanediol; glycerol, 1:1:1-trimethylolpropane, sorbitol, mannitol, pentaerythritol; quinitol, resorcitol.

This procedure gives rise to epoxidizable acetals, for example of the type

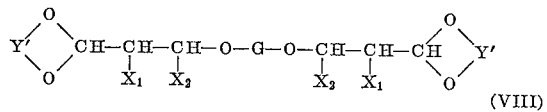

(VIII)

(G=radical of the diol) that is to say that the radical Z' in Formula II is a radical of the formula

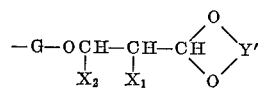

As relevant examples may be mentioned the adducts of 2 mols of the acetal of acrolein and 1:1-bis-(hydroxymethyl)-cyclohexene-3 with 1 mol of a glycol or polyglycol such as ethylene glycol.

Instead of a diol or glycol there may be used water for the additive reaction of 2 mols of an unsaturated acetal VI derived from an unsaturated diol, whereby a simple ether of the formula

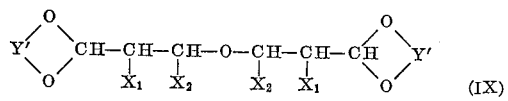

(IX)

is obtained, that is to say that the radical Z' in the Formula II is in this case a radical of the formula

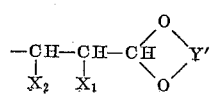

Furthermore, 1 to ($x$−1) mols of an unsaturated acetal VI derived from an unsaturated diol may be added on to 1 mol of a polyhydroxy compound containing $x$ hydroxyl groups. The free hydroxyl group(s) of the resulting adduct can then be further reacted with compounds containing in addition to epoxidizable groups such groups as can be condensed with hydroxyl groups, for example carboxyl or hydroxyl groups, halogen atoms or the like.

Thus, for example, in a first stage 1 mol of the acetal of acrolein and 1:1-bis-[hydroxymethyl]-cyclohexene-3 can be added on to 1 mol of a glycol or polyglycol, and in a second stage the resulting adduct is etherified, for example, with 1 mol of epichlorohydrin or $\Delta^3$-tetrahydrobenzyl alcohol or dihydrodicyclopentadienol or esterified with 1 mol of $\Delta^3$-tetrahydrobenzoic acid.

When the radical of the polyol contains additionally at least one epoxidizable group, acetals of the Formula II are also obtained when in a second stage an alcohol of the formula Z'—OH or Z—OH which as such contains an epoxide group, is added on. As examples of such alcohols may be mentioned glycidol or more especially epoxidized hydroaromatic alcohols of the formula

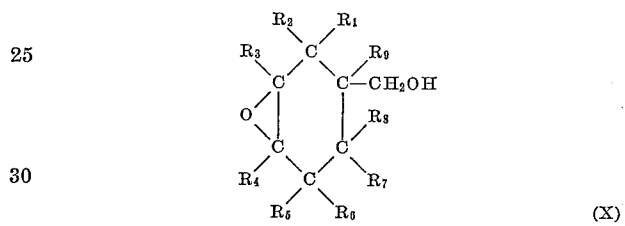

(X)

such as 3:4-epoxy-hexahydrobenzyl alcohol.

By subjecting such an alcohol Z—OH containing an epoxide group to an additive reaction with an acetal III there are obtained by the variant B of the present process directly the new epoxides of the Formula I. However, in this case the radical of the polyol no longer contains any epoxidizable groups; it contains either an epoxide group or is free from epoxide groups. The former is the case when the radical is that of a diol, the latter in general when the radical is that of a polyol containing at least four hydroxyl groups.

The additive combination of the alcohol Z'—OH or Z—OH with the carbon-to-carbon double bond of the aldehyde radical is advantageously carried out in the known manner, in the presence of a basic catalyst, such as sodium hydroxide, or more especially of an acid catalyst or a Lewis acid, such as sulfuric acid or boron trifluoride.

According to the variant A of the present process the acetal II, which still contains at least one epoxidizable group such as an epoxidizable carbon-to-carbon double bond or a halohydrin group, is treated with an epoxidizing agent.

The epoxidation of the carbon-to-carbon double bond yielding the compound of the present invention is carried out by a conventional method, preferably with the aid of an organic per-acid, such as peracetic, perbenzoic, peradipic, monoperphthalic acid or the like. Another suitable epoxidizing agent is hypochlorous acid; when this substance is used HOCl is added on to the double bond in a first stage, whereupon in a second stage, by treatment with a hydrogen chloride donor, for example a strong alkali, the epoxide group is formed.

In correspondence with what has been said above with respect to the meaning of the term "radical containing an epoxidizable group," the treatment according to the invention with the epoxidizing agent includes also the treatment with an agent capable of splitting off hydrogen halide (such as potassium hydroxide or sodium hydroxide) of halohydrin groups, for example the glycerol-monochlorohydrin group, with formation of the corresponding 1:2-epoxide group or of a glycidyl group.

When the acetal II contains epoxidizable carbon-tocarbon double bonds as well as halohydrin groups, the epoxidation is performed in two stages: advantageously, the carbon-to-carbon double bonds are first epoxidized and the halohydrin groups are then converted into epoxide groups.

The epoxidation may lead, in addition to the diepoxides or polyepoxides respectively, to wholly or only partially hydrolysed epoxides stemming from side reactions, that is to say compounds in which the epoxide groups of the polyepoxide I have been wholly or partially hydrolysed to hydroxyl groups.

The present invention is based on the observation that in general the presence of such by-products has a favourable effect on the technical properties of the cured polyepoxides; accordingly it is in general of advantage not to isolate the pure polyepoxide from the reaction mixture.

The epoxidized acetals of the present invention may also contain, of course, other functional groups, depending on the polyols and on the alcohols Z—OH from which they are derived. More especially, there may be present in addition to the acetalized hydroxyl groups of the polyol, free hydroxyl groups so that certain properties, such as the adhesivity or hydrophilicity or the curing speed of the epoxide compounds of the invention can be modified extensively.

Particularly advantageous properties are found in the diepoxides of the general formula

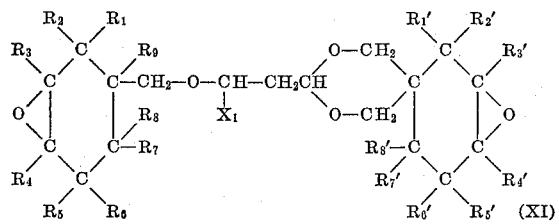
(XI)

in which $X_1$ stands for a methyl group or for a hydrogen atom, and $R_1$ to $R_9$ and $R_1'$ to $R_8'$ each stand for monovalent substituents such as halogen atoms or aliphatic, cycloaliphatic, araliphatic or aromatic hydrocarbon radicals, more especially for alkyl radicals with 1 to 4 carbon atoms, or for hydrogen atoms, and in which $R_1$ and $R_5$ together or $R_1'$ and $R_5'$ together may also form an alkylene radical such as a methylene group.

Most readily available are the diepoxide compounds of the formula

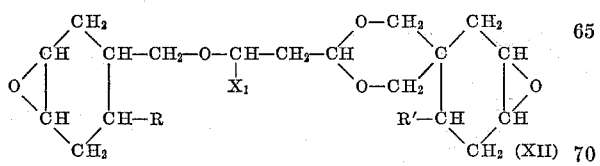
(XII)

in which $X_1$ represents a hydrogen atom or a methyl group, and R and R' each represent a hydrogen atom or a lower alkyl radical.

The epoxides defined above are bright, viscid or fusible resins which can be converted with suitable curing agents such, for example, as dicarboxylic anhydrides, into clear, bright, cured products having excellent technical properties, more especially an outstandingly high thermal stability according to Martens.

Similarly valuable technical properties are also found in the diepoxide compounds of the formulae

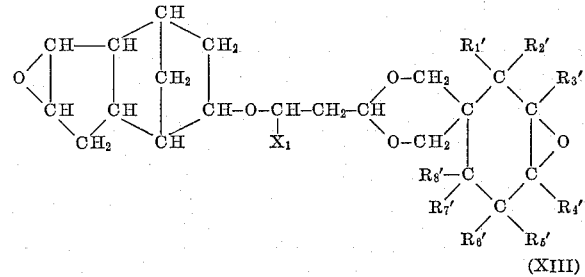
(XIII)

and

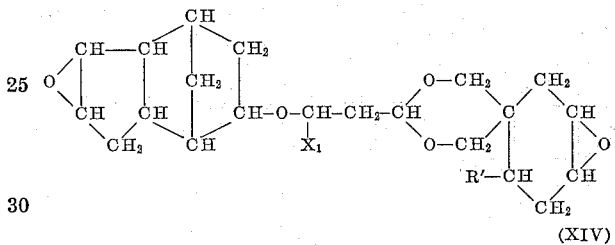
(XIV)

in which the radicals $X_1$, R' and $R_1'$ to $R_8'$ have the same meanings as in Formulae XI and XII.

Further distinguished by their advantageous properties are the polyepoxide compounds of the general formula

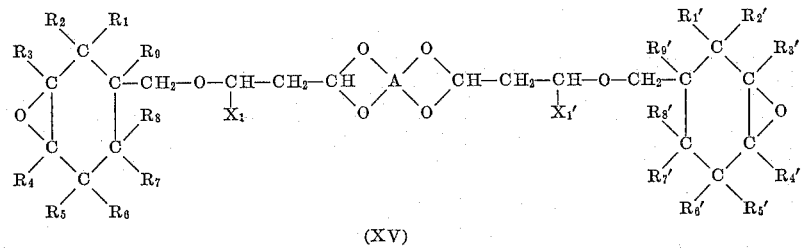
(XV)

in which $X_1$ and $X_1'$ each stand for hydrogen atoms or methyl groups and the radicals $R_1$ to $R_9$ and $R_1'$ to $R_8'$ have the same meanings as in Formula XI and $R_9'$ has the same meaning as $R_9$, and A represents a tetravalent aliphatic radical which contains at least four carbon atoms, none of which has more than a single free valence; the aliphatic radical A may be unsubstituted or substituted, for example, by hydroxyl, ether, sulfide, carboxyl, carboxylic acid ester groups, keto, aldehyde, acetal groups or the like.

In an important special case the radical A may be substituted by more than 2, for example, 3, 4 or more, acetal groupings of the formula

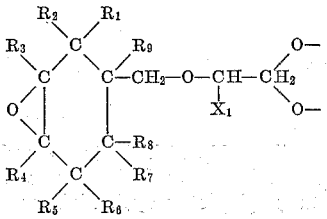

Also in this case there are most readily accessible the diepoxide compounds of the formula

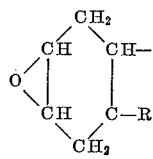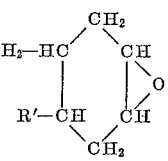

(XVI)

in which $X_1$ and $X_1'$ each stand for hydrogen atoms or methyl groups, R and R' for hydrogen atoms or lower alkyl groups, and A' for a tetravalent saturated aliphatic hydrocarbon radical which may be substituted by at most two hydroxyl groups and which contains 4, 5 or 6 carbon atoms, none of which contains more than a single free valence, and furthermore no hydroxyl groups may be bound to carbon atoms having such a free valence.

The epoxides constitute bright, fusible resins which can be converted with suitable curing agents, for example dicarboxylic anhydrides, into clear, bright, cured products having excellent technical properties.

Furthermore, there may be mentioned in this connection triepoxide compounds of the formula

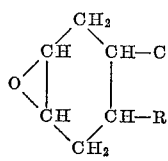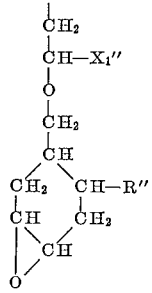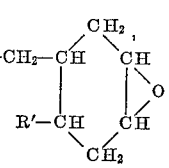

(XVII)

in which $X_1$, $X_1'$ and $X_1''$ each stand for hydrogen atoms or methyl groups, R, R' and R'' for hydrogen atoms or lower alkyl-radicals, and A'' represents a hexavalent saturated aliphatic hydrocarbon radical which contains 6 carbon atoms, none of which has more than a single free valence.

The properties of these last-mentioned epoxides resemble those of the epoxides of the Formula XVI.

Products that likewise have a considerable practical importance are the diepoxide compounds of the general formulae

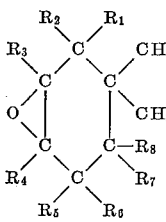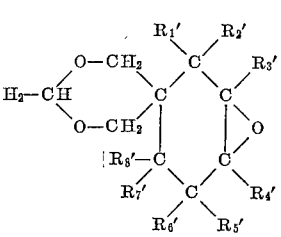

(XVIII)

and

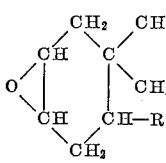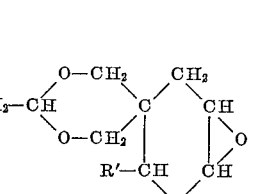

(XIX)

in which the radicals $X_1$, $X_1'$, $R_1$ to $R_8$ and $R_1'$ to $R_8'$ have the same meanings as in the Formulae XV and XVI; G represents an aliphatic or cycloaliphatic hydrocarbon radical which may be interrupted by oxygen atoms; and $p=1$ or 2.

The most advantageous manner of preparing these preferred diepoxide compounds of the Formulae XI, XII, XV or XVIII is to react an epoxidizing agent on a hydroaromatic acetal of any one of the formulae

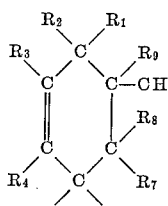

(XX)

(XXI)

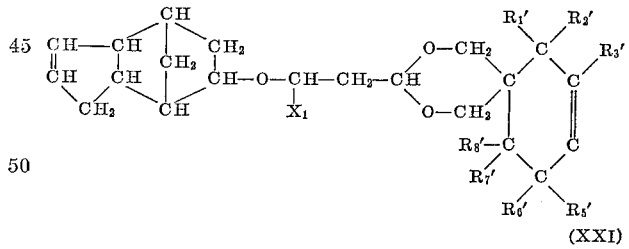

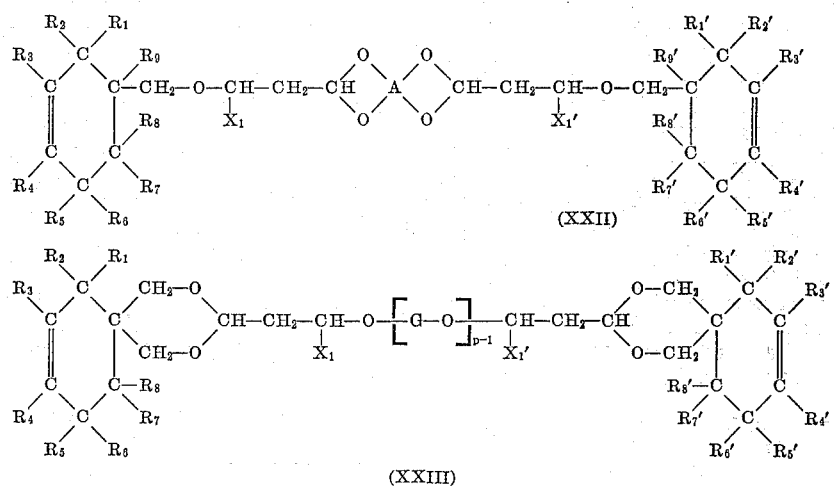

(XXII)

(XXIII)

in which $X_1, X_1', R_1$ to $R_9, R_1'$ to $R_9'$, A, G and p have the same meanings as in Formulae XI, XIII, XV, XVIII. The acetals of the Formulae XX and XXI are obtained in the simplest manner as follows:

Acrolein or crotonic aldehyde is acetalized with a diol IV, whereby an acetal of the formula

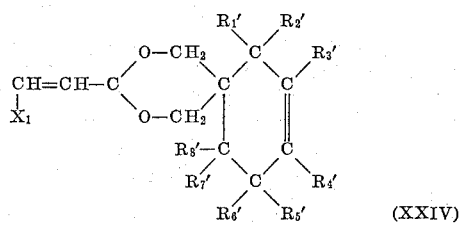

(XXIV)

is obtained which is then subjected to an additive reaction with a hydroaromatic alcohol of the formula VII or with dihydrodicyclopentadienol-8, whereby the acetal XXIV is obtained.

The acetals of the Formula XXII are easiest to prepare in the following manner:

Acrolein or crotonic aldehyde is acetalized with a polyol which contains at least 4 hydroxyl groups, whereby a spirocyclic acetal of the formula

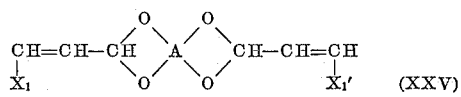

(XXV)

is obtained, of which 1 mol is added on to 2 mols of a hydroaromatic alcohol of the Formula VII.

In a similar manner there can be prepared the derivatives of dihydrodicyclopentadienol by adding on to 2 mols thereof 1 mol of acetal XXV.

The acetals of the Formula XXIII are easiest to prepare by an additive reaction of 2 mols of an acetal XXIV with 1 mol of water ($p=1$) or 1 mol of a diol of the formula HO—G—OH ($p=2$).

Instead of first preparing a hydroaromatic acetal of the Formula XX or XXII and treating it with an epoxidizing agent, the diepoxide compounds of the Formula XI or XV are also obtained by adding an epoxidized hydroaromatic alcohol X on to an acetal XXIV or XXV.

The epoxidized acetals of the present invention react with the conventional curing agents for epoxide compounds; with the aid of such curing agents they can be cross linked or cured in the same manner as other polyfunctional epoxide compounds or epoxy resins. Suitable relevant curing agents are basic or more especially acidic compounds.

Good results have been achieved with amines or amides, such as aliphatic and aromatic primary, secondary and tertiary amines, for example monobutylamine, dibutylamine, tributylamine, para-phenylenediamine, bis-[para-aminophenyl]-methane, ethylenediamine, N:N-diethylenediamine, N:N-dimethylpropylenediamine, diethylenetriamine, tetra-[hydroxyethyl]-diethylenetriamine, triethylenetetramine, tetraethylenepentamine, trimethylamine, diethylamine, triethanolamine, Mannich's bases, piperidine, piperazine, guanidine and guanidine derivatives such as phenyldiguanidine, diphenylguanidine, dicyandiamide, aniline-formaldehyde resins, urea-formaldehyde resins, melamine-formaldehyde resins, polymers of aminostyrenes, polyamides, for example those of aliphatic polyamines and dimerized or trimerized unsaturated fatty acids, isocyanates, isothiocyanates; polyhydric phenols, for example resorcinol, hydroquinone, bis-[4-hydroxyphenyl]-dimethylmethane, quinone, phenolaldehyde resins, oil-modified phenolaldehyde resins, reaction products of aluminum alcoholates or phenolates with compounds of tautomeric reaction of the type of the acetoacetic ester, Friedel-Crafts catalysts, for example aluminum chloride, antimony pentachloride, tin tetrachloride, zinc chloride, boron trifluoride and complexes thereof with organic compounds, metal fluoborates, boroxines, or phosphoric acid. Preferably used curing agents are polybasic carboxylic acids and anhydrides thereof, for example phthalic anhydride, methylendomethylene-tetrahydrophthalic anhydride, dodecenyl-succinic anhydride, tetrahydrophthalic anhydride, hexahydrophthalic anhydride, hexachloroendomethylene-tetrahydrophthalic anhydride or endomethylene-tetrahydrophthalic anhydride. or mixtures thereof; maleic or succinic anhydride; if desired, accelerators may be used additionally, such as tertiary amines or strong Lewis bases, such, for example, as alkali metal alcoholates, and advantageously polyhydroxy compounds such as hexanetriol, or glycerol.

It has been observed that in curing the epoxy resins of the invention with carboxylic anhydrides it is of advantage to use for every gram equivalent of epoxide groups only about 0.3 to 0.9 gram equivalent of anhydride groups. When a basic accelerator is used, such as an alkali metal alcoholate or an alkali metal salt of a carboxylic acid, up to 1.0 gram equivalent of anhydride groups may be used.

The term "curing" as used in this connection refers to the conversion of the epoxide compounds described above into insoluble and infusible resins.

Accordingly, the present invention also provides curable mixtures containing the epoxidized acetals according to the invention as well as curing agents for epoxy resins, preferably an anhydride of a dicarboxylic or polycarboxylic acid.

The curable mixtures of the present invention further contain with advantage a certain share of otherwise suitable acetals whose epoxide groups, however, are wholly or partially hydrolysed to hydroxyl groups and/or other polyhydroxy compounds displaying a cross-linking action, such as hexanetriol. It will be readily understood that the curable epoxide compounds may also contain other epoxides such, for example, as mono- or polyglycidyl ethers of mono- or polyalcohols such as butanol, 1:4-butanediol or glycerol, or of mono- or polyphenols such as resorcinol, bis-[4-hydroxyphenyl]-dimethylmethane or condensation products of aldehydes with phenol (novolaks); furthermore polyglycidyl esters of polycarboxylic acids such as phthalic acid, and also aminopolyepoxides such as are obtained, for example, by dehydrohalogenating a reaction product of an epihalohydrin with a primary or secondary amine, such as n-butylamine, aniline or 4:4'-di-(monomethylamino)-diphenylmethane.

The curable epoxide compounds or mixtures thereof with curing agents may also be treated before the curing at any desired phase with a filler, plasticizer, coloring matter or the like. Suitable extenders and fillers are, for example, asphalt, bitumen, glass fibers, mica, quartz meal, cellulose, kaolin, finely dispersed silicic acid (Aerosil) or metal powders.

The mixtures of the new epoxide compounds and curing agents can be used with or without fillers, if desired in the form of solutions or emulsions, as textile assistants, laminating resins, paints, lacquers, dipping resins, casting resins, coating compositions, pore-fillers, putties, adhesives, moulding compositions or the like, as well as for the manufacture of such products. The new resins are particularly valuable as insulating compounds for the electrical industry.

In the following examples parts and percentages are by weight, the relationship between parts by weight and parts by volume being the same as that between the kilogram and the liter.

EXAMPLE 1

(a) *Acetal of acrolein and 1:1-bis-[hydroxymethyl]-cyclohexene-3*

A mixture of 118 parts of acrolein, 286 parts of 1:1-bis-[hydroxymethyl]-cyclohexene-3 and 3 parts by volume of sulfuric acid of 50% strength is heated for 20 minutes at 50° C. When all has passed into solution, 700 parts by volume of benzene and 2 parts of para-toluenesulfonic acid are added and the whole is boiled for 40 minutes in a circulation distillation apparatus until 40 parts of water have distilled over azeotropically. The solution is treated with 4 parts of anhydrous sodium carbonate, filtered and evaporated. The benzene is distilled off at 54–61° C. under a pressure of 0.2 mm. Hg, and 319 parts of acetal (3 - vinyl - 2:4 - dioxospiro(5:5)-undecene-9) pass over which corresponds to a yield of 87% of the theoretical. There remain 40 parts of an unidentified residue.

(b) *Additive reaction with Δ³-tetrahydrobenzyl alcohol*

A mixture of 225 parts of the acetal described above (3-vinyl-2:4-dioxospiro(5:5)-undecene-9), 140 parts of Δ³-tetrahydrobenzyl alcohol, 0.5 part by volume of concentrated sulfuric acid and 0.5 part by volume of a solution of 50% strength of boron trifluoride in diethyl ether (boron trifluoride present in the form of its etherate) is heated to 80° C and then allowed to cool. There are obtained 360 parts of a brown liquid in which tetrahydrobenzyl alcohol can no longer be detected; it consists substantially of 3-[Δ³-tetrahydrobenzyl-hydroxyethyl]-2:4-dioxospiro(5:5)-undecene-9.

(c) *Epoxidation*

320 parts of the above 3-[Δ³-tetrahydrobenzyl-hydroxyethyl]-2:4-dioxospiro-(5:5)-undecene-9 (crude product) are dissolved in 1000 parts by volume of benzene and 25 parts of sodium acetate are added. In the course of 20 minutes 462 parts of per-acetic acid of 39.5% strength are stirred in in portions, while maintaining the temperature at about 35° C. by intensive cooling. When the mixture has reacted for another 2 hours at 30° C. with stirring, the reaction is complete and the reaction mixture is cooled to room temperature. Titration reveals that the theoretical amount of peracetic acid has been consumed.

The benzene solution is washed three times with 300 parts by volume of water and then with aqueous sodium hydroxide solution until it is neutral and washed twice more with 150 parts by volume of water. The benzene solution is dried over sodium sulfate, filtered and evaporated under reduced pressure. The last remnants of the solvent are expelled in a high vacuum at 100° C. There are obtained 317 parts of a pale-yellow liquid resin containing 5.3 epoxide equivalents per kg. and having a viscosity of about 25,000 centipoises at 20° C., it consists substantially of the diepoxide of the formula

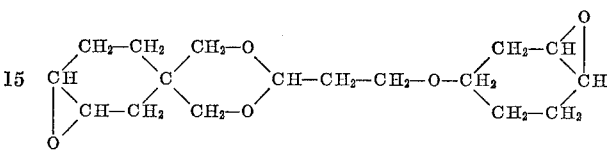

EXAMPLE 2

(a) *Acetal of acrolein and 1:1-bis[hydroxymethyl]-6-methylcyclohexene-3*

A mixture of 56 parts of acrolein, 157 parts of 1:1-bis-[hydroxymethyl]-6-methylcyclohexene-3 and 1 part of sulfuric acid of 50% strength is heated in a water bath at 40° C. until all has passed into solution. An exothermic reaction sets in so that after removal of the water bath the temperature rises to 50° C. 350 parts by volume of benzene are then added and the mixture is boiled for 40 minutes in a circulation distillation apparatus until 20 parts of water have passed over azeotropically. The solution is treated with 2 parts of anhydrous sodium acetate, filtered and evaporated. The benzene is distilled off under a vacuum of 0.5 mm. Hg at 81° C. and 163 parts of acetal [3-vinyl-7-methyl-2:4-dioxospiro(5:5)-undecene-9] pass over which corresponds to a yield of 83.6% of the theoretical. There remain 27 parts of an unidentified residue.

(b) *Additive reaction with Δ³-tetrahydrobenzyl alcohol*

A mixture of 65 parts of the above acetal [3-vinyl-7-methyl-2:4-dioxospiro(5:5)-undecene-9], 38 parts of Δ³-tetrahydrobenzyl alcohol, 0.5 part of concentrated sulfuric acid and 0.5 part of a solution of 40% strength of boron trifluoride in diethyl ether (boron trifluoride present as the etherate) is heated for 4 hours at 80° C., left to itself for 15 hours, and then shaken with 2 parts of anhydrous sodium carbonate, to yield 101 parts of a liquid in which tetrahydrobenzyl alcohol can no longer be detected; it consists substantially of 3-[Δ³'-tetrahydrobenzyl-hydroxyethyl]-7-methyl-2:4-dioxospiro(5:5)-undecene-9.

(c) *Epoxidation*

A solution of 97 parts of the above 3[Δ³-tetrahydrobenzyl - hydroxyethyl] - 7 - methyl - 2:4 - dioxospiro-(5:5)-undecene-9 in 280 parts by volume of benzene is treated with 7 parts of anhydrous sodium acetate and in the course of 30 minutes 148 parts of peracetic acid of 39.5% strength are stirred in dropwise, while maintaining the temperature at 30–35° C. by external cooling. After 2 hours 91% of the theoretical amount of peracetic acid have been consumed. After 3 hours the reaction mixture is allowed to cool to room temperature, the aqueous bottom phase is separated and the supernatant phase washed three times with 100 parts by volume of water on each occasion, then neutralized by being shaken with 100 parts by volume of water containing 7 parts by volume of sodium hydroxide solution of 30% strength, then washed twice with 50 parts by volume of water on each occasion, dried over sodium sulfate, filtered and evaporated at 100° C. under a pressure of 0.15 mm. Hg. There are obtained 774 parts of a liquid, pale-yellow resin containing 4.5 epoxide equivalents per kg. and having a viscosity of 27,474 centipoises at 20° C.

This resin consists substantially of the diepoxide of the formula

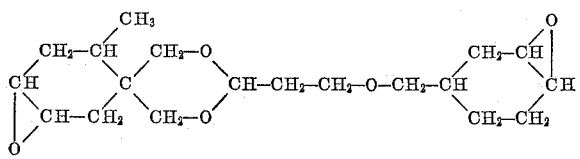

EXAMPLE 3

(a) *Acetal of crotonic aldehyde and 1:1-bis-[hydroxymethyl]-cyclohexene-3*

A mixture of 70 parts of crotonic aldehyde, 143 parts of 1:1-bis-[hydroxymethyl]-cyclohexene-3 and 0.8 part by volume of sulfuric acid of 50% strength is heated for 15 minutes at 50° C. until all has passed into solution and an exothermic reaction sets in. 350 parts by volume of benzene are added and the whole is boiled for 30 minutes in a circulation distillation apparatus until 18 parts of water have passed over azeotropically. The solution is treated with 2 parts of anhydrous sodium acetate, filtered and evaporated. The benzene is distilled off at 92° C. under 0.5 mm. Hg and there are obtained 180 parts of acetal [3 - propenyl - 2:4 - dioxospiro(5:5)-undecene-9] corresponding to 92% of the theoretical yield.

(b) *Addition reaction with Δ³-tetrahydrobenzyl alcohol*

A mixture of 176 parts of the above acetal [3-propenyl-2:4-dioxospiro(5:5)-undecene-9], 105 parts of Δ³-tetrahydrobenzyl alcohol and 0.8 part by volume of sulfuric acid of 50% strength is heated for 8 hours at 80° C., then left to itself for 15 hours, and freed from unreacted tetrahydrobenzyl alcohol by evaporation under vacuum, 19 parts of the alcohol passing over at 40° C. under 0.15 mm. Hg. The residue amounts to 253 parts, corresponding to a yield of crude product of 92% consisting substantially of 3[Δ³''-tetrahydrobenzoyloxy-(2')-propyl]-2:4-dioxospiro(5:5)-undecene-9.

(c) *Epoxidation*

A solution of 253 parts of the above 3-[Δ³''-tetrahydrobenzoyloxy - (2') - propyl] - 2:4 - dioxospiro(5:5) - undecene-9 in 750 parts by volume of benzene is treated with 20 parts of anhydrous sodium acetate, and in the course of 45 minutes 340 parts of peracetaic acid of 39.9% strength are stirred in dropwise, while maintaining the temperature at 30–35° C. by external cooling. After 2 hours the theoretical amount of peracetic acid has been consumed. The whole is allowed to cool to room temperature, the aqueous bottom phase is separated and the supernatant phase washed three times with 150 parts by volume of water on each occasion and then neutralized by being shaken with 100 parts by volume of water containing 7 parts by volume of sodium hydroxide solution of 30% strength, then washed twice with 100 parts by volume of water on each occasion, dried over sodium sulfate, filtered and evaporated at 100° C. under 15 mm. Hg in the course of 30 minutes. There are obtained 774 parts of a viscid yellow resin containing 5.1 epoxide equivalents per kg. and having a viscosity of 102,700 centipoises at 20° C.

This resin consists substantially of the diepoxide of the formula

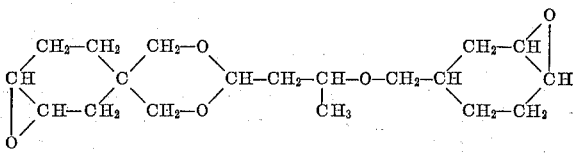

EXAMPLE 4

An acetal is prepared as described in the preceding examples from 107 parts of crotonic aldehyde and 229 parts of 1:1-bis-[hydroxymethyl]-6-methylcyclohexene-3 in the presence of 1 mol of sulfuric acid of 50% strength and of benzene for the azeotropic distillation of the reaction water. When the reaction mixture is fractionated under vacuum, 270 parts of 3-propenyl-7-methyl-2:4-dioxospiro(5:5)-undecene-9 pass over at 75–82° under 0.2 mm. Hg.

A mixture of 158 parts of this acetal, 75 parts of 6-methyl-Δ³-tetrahydrobenzyl alcohol and 1.5 parts of a solution of 40% strength of boron trifluoride in diethyl ether is heated for 2 hours at 80° C. After 30 parts of forerunnings have been distilled off at 140° C. under 0.1 mm. Hg, there remain 230 parts of residue which consists substantially of the adduct of 3-[6''methyl-Δ³''-tetrahydrobenzoyloxy - (2') - propyl - 7 - methyl - 2:4 - dioxospiro-(5:5)-undecene-9.

A mixture of 215 parts of this adduct and 600 parts by volume of benzene is treated with 16 parts of sodium acetate; while continuously stirring the mixture, 249 parts of peracetic acid of 42% are added in portions at 30° C. After 2 hours the theoretical amount of peracetic acid has been consumed, and the reaction mixture is then worked up as described in the preceding examples. Evaporation at 100° C. under 0.1 mm. Hg yields a bright, viscid resin containing 4.7 epoxide equivalents per kg. which consists substantially of the diepoxide of the formula

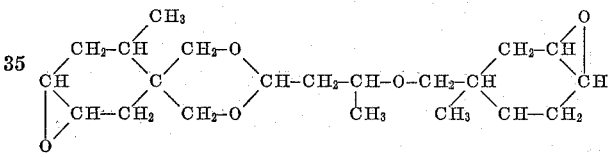

and can be cured with phthalic anhydride to form a pale, infusible resin.

EXAMPLE 5

A mixture of 22 parts of the cyclic acetal of 2 mols of acrolein and 1 mol of pentaerythritol—referred to as 3:9-divinyl-spiro-bi-[meta-dioxane] or as 3:9-divinyl-2:4:8:10-tetraoxospiro(5:5)-undecane—and 22 parts of Δ³-tetrahydrobenzyl alcohol is treated with 0.1 part of sulfuric acid of 60% strength and 0.2 part of a solution of 40% strength of boron trifluoride in diethyl ether. The mixture is heated for 12 hours at 80° C., after which time a viscid, yellowish brown product has formed in which tetrahydrobenzyl alcohol can no longer be detected and which consists substantially of the adduct 3:9 - bis - [Δ³ - tetrahydrobenzyl-hydroxyethyl]-spiro-bi-[meta-dioxane].

A solution of 45 parts of the above adduct in 140 parts by volume of benzene is treated with 4 parts of sodium acetate. In the course of 15 minutes, 40 parts of peracetic acid of 42.8% strength are stirred in dropwise. while maintaining the temperature at 30° C. by cooling with ice. The mixture is then stirred for another 60 minutes at 30° C. and the aqueous bottom phase is separated. The benzene solution is washed twice with 50 parts by volume of water on each occasion, dried over sodium sulfate and evaporated, to yield a viscid resin containing 2.70 epoxide equivalents per kg. This resin consists substantially of the diepoxide of the formula

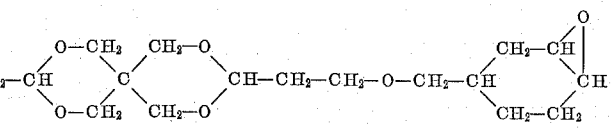

and can be cured with phthalic anhydride to form a bright, infusible resin.

EXAMPLE 6

A mixture of 91 parts of the cyclic triacetal of 3 mols of acrolein and 1 mol of sorbitol, 105 parts of $\Delta^3$-tetrahydrobenzyl alcohol and 0.5 part of a solution of 45% strength of boron trifluoride in diethyl ether is heated for 5 hours at 80° C., allowed to cool, and 30 parts of unreacted tetrahydrobenzyl alcohol are then distilled out of the mixture at 45° C. under 0.15 mm. Hg. Thus, the residue consists of an adduct of exactly 2 mols of the alcohol and 1 mol of the triacetal. This adduct is epoxidized in the following manner:

A solution of 153 parts of the residue described above in 350 parts by volume of benzene is treated with 7 parts of sodium acetate. In the course of 35 minutes, 134 parts of peracetic acid of 35.8% strength are stirred in dropwise, while maintaining the temperature at 30–35° C. by cooling with ice. When the mixture is stirred for another 60 minutes at 30° C., the theoretical amount of peracetic acid has been consumed. The mixture is allowed to cool and the aqueous bottom phase is separated. The benzene solution is washed twice with 100 parts by volume of water on each occasion and once with 100 parts by volume of aqueous 2 N-sodium hydroxide solution, then washed twice with 50 parts by

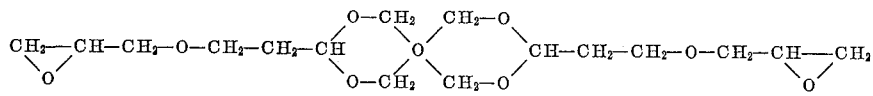

volume of water, dried over sodium sulfate, filtered and evaporated under 0.5 mm. Hg pressure, finally at 100° C. There are obtained 159 parts of a yellow, viscid resin containing 2.1 epoxide equivalents per kg. This resin can be cured with phthalic anhydride to form a bright, infusible resin.

EXAMPLE 7

A mixture of 23 parts of glycerol-α-monochlorohydrin and 36 parts of the acetal prepared as described in Example 1 from acrolein and 1:1-bis-[hydroxymethyl]-cyclohexene-3 is treated with 0.5 part of a solution of 40% strength of boron trifluoride in diethyl ether and heated for 80 minutes at 80° C.

The cycloolefinic double bond in the resulting adduct —3 - [2′ - hydroxy - 3′ - chloropropoxyethyl] - 2:4 - dioxospiro(5:5)-undecene-9—is epoxidized in the following manner:

The completely reacted reaction mixture described above (about 59 parts) is treated with 150 parts of benzene and 5 parts of anhydrous sodium acetate. While stirring and cooling with ice 36 parts of peracetic acid of 42.8% strength are added dropwise within 30 minutes at 30° C., and the mixture is then stirred on for 60 minutes at 30° C., after which time the theoretical amount of peracetic acid has been consumed and the mixture is then worked up as described in the preceding examples, to yield 52 parts of monoepoxidized chlorohydrin.

The resulting monoepoxide is converted into a diepoxide in the following manner:

The 52 parts of the above epoxidized chlorohydrin—3 - [2′ - hydroxy - 3′ - chloropropoxyethyl] - 9:10 - epoxy-2:4-dioxospiro(5:5) undecane—are treated with 27 parts of aqueous sodium hydroxide solution of 28% strength and the whole is heated for one hour at 50° C. 100 parts of benzene are then added and the precipitated solid sodium chloride is filtered off. The benzene layer is separated, washed until neutral and finally evaporated in a high vacuum, to yield 42 parts of a pale-yellow, liquid epoxy resin consisting substantially of the diepoxide compound of the formula

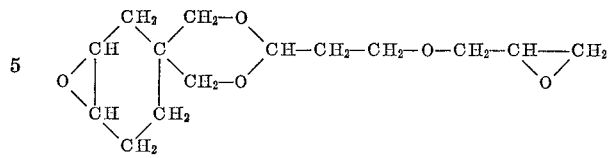

With the aid of phthalic anhydride it can be cured to form a practically colorless, infusible resin.

EXAMPLE 8

A mixture of 45 parts of glycerol-α-monochlorohydrin and 43 parts of the cyclic acetal of 1 mol of pentaerythritol and 2 mols of acrolein—3:9 - divinyl - spiro - bi - [meta-dioxane]—is treated with 0.5 part of a solution of 45% strength of boron trifluoride. For 15 minutes a weakly exothermic reaction can be observed, after the completion of which free glycerol-α-monochlorohydrin can no longer be detected in the reaction mixture. The whole is then allowed to cool, treated with 63 parts of aqueous sodium hydroxide solution of 28% strength and heated with vigorous stirring for one hour at 45° C. The solid sodium chloride is then filtered off, the benzene solution is separated and evaporated, to yield as residue 70 parts of a viscid pale-yellow resin containing 1.8 epoxide equivalents per kg. which consists substantially of the diepoxide of the formula

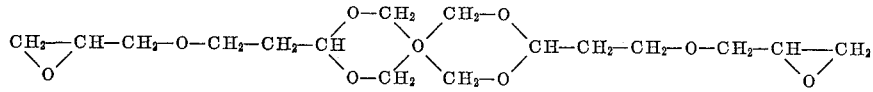

and can be cured with phthalic anhydride to form an infusible resin which is only slightly tinted.

EXAMPLE 9

Phthalic anhydride as curing agent is dissolved in 100 parts of the polyepoxy resin prepared as described in Example 1 at 120 to 125° C.; in a first test 0.45 equivalent of anhydride groups and in a second test 0.65 equivalent of anhydride groups per equivalent of epoxide groups are used. At 120° C. the mixtures have a viscosity below 10 centipoises.

A first portion of the mixtures is cast in aluminum moulds (40 x 10 x 140 mm.) and cured for 24 hours at 140° C. The resulting castings have the following properties:

| Test | Impact bending strength cm. kg./sq. cm. | Bending strength kg./sq. mm. |
|---|---|---|
| 1 | 9.7 | 11.7 |
| 2 | 12.6 | 11.8 |

A second portion of each of the above mixtures is cast in a layer about 0.1 mm. and 1 mm. thick on plates of glass and then cured for 24 hours at 140° C. The films cured in this manner adhere excellently to the support and are resistant towards 5 N-sulfuric acid, 5 N-sodium hydroxide solution, water, acetone and chlorobenzene after exposure thereto for one hour at room temperature.

EXAMPLE 10

100 parts of the polyepoxy resin prepared as described in Example 1 are mixed at room temperature with 11.9 parts of 2:4-dihydroxy-3-hydroxymethylpentane, and in this mixture 51 parts of phthalic anhydride are dissolved at 120–125° C. as curing agent. When, as described in Example 9, this mixture (about 90 grams) is cast in aluminum moulds it gels at 120° C. within about one hour, that is to say that the originally liquid mixture has solidified to form a gel. After having been cured for 24 hours at 140° C. the casting displays an impact bending strength of 12.7 cm. kg./sq. cm. and a bending strength of 16.0 kg./sq. mm.

EXAMPLE 11

51 parts of phthalic anhydride (0.65 equivalent of anhydride groups per equivalent of epoxide groups) are dissolved at 120 to 130° C. in 100 parts of a polyepoxy resin prepared as described in Example 1. At 120° C. the mixture has a viscosity below 10 centipoises and after 2½ hours of 1500 centipoises. The mixture is cast in aluminum moulds as described in Example 9. Curing is carried out in two stages, first for 24 hours at 140° C. and then for 24 hours at 200° C. The resulting casting has an outstandingly high thermal stability of over 235° (measured according to Martens DIN).

EXAMPLE 12

5.94 parts of a sodium alcoholate prepared by dissolving 0.41 part of sodium metal at about 120° C. in 100 parts of 2:4-dihydroxy-3-hydroxymethylpentane are dissolved at room temperature in 100 parts of the epoxy resin prepared as described in Example 1. 1.0 equivalent of phthalic anhydride per equivalent of epoxide groups is fused in as curing agent at 120–125° C. A first portion of the mixture is cast in aluminum moulds as described in Example 9 and cured for 24 hours at 140° C. The resulting casting has the following properties:

Impact bending strength _____ 13.6 cm. kg./sq. cm.
Bending strength _____ 14.8 kg./sq. mm.
Thermal stability according to Martens DIN _____ 166°.

Another portion of the above mixture is used for cementing tests in which degreased and ground strips of aluminum (170 x 25 x 1.5 mm.; overlap 10 mm.) marketed under the trade name "Anticorodal B" are cemented together. The curing of the cemented joint is carried out for 24 hours at 140° C.

At different test temperatures the following tensile shear stresses are obtained:

| Test temperature in ° C.: | Tensile shear strength kg./sq. mm. |
|---|---|
| Room temperature | 1.05 |
| 100 | 0.92 |
| 150 | 0.88 |
| 170 | 0.80 |
| 190 | 0.82 |

As is shown by this table the cemented joints display excellent tensile shear strengths, above all at the extremely high test temperature of 150–190° C.

EXAMPLE 13

100 parts of the polyepoxy resin prepared as described in Example 3 are fused together with 45.6 parts of phthalic anhydride as curing agent at 120–125°, 0.6 equivalent of anhydride groups being used for every equivalent of epoxide groups of the resin. The mixtures are cured in an aluminum mould (40 x 10 x 140 mm.) for 24 hours at 150° C. The casting cured in this manner has an impact bending strength of 13.9 cm. kg./sq. cm. and a bending strength of 10.1 kg./sq. mm.

EXAMPLE 14

2.5 parts of a boron trifluoride/monoethylamine complex are dissolved in 50 parts of the polyepoxy resin prepared as described in Example 3. The mixture is cast in an iron mould and cured for 16 hours at 150° C. The resulting casting has a thermal stability of 138° (measured according to Martens DIN).

EXAMPLE 15

A mixture of 86 parts of ethylene glycol and 550 parts of the acetal obtained according to Example 1(a) from 1:1-bis-[hydroxymethyl]-cyclohexene-3 and acrolein (3-vinyl-2:4-dioxospiro-5:5-undecene-9) is heated to 80° C., and 1 part of concentrated sulfuric acid is stirred in, whereupon the temperature rises slightly. The reaction mixture is then heated for 2 hours at 85–90° C., at first with slight cooling and after the evolution of heat has subsided by heating on an oil bath. The acid is then neutralized with 2 parts of sodium carbonate, and 41 parts of excess acetal, passing over at 550 C. under 0.3 mm. Hg, are distilled out of the reaction mixture. The ethylene glycol has reacted completely. The resulting distillation residue consists of 578 parts of crude ethylene glycol-bis-[2-(2':4' - dioxospiro - 5':5') - undecene-9'-yl-(3')-ethyl]-ether in the form of a pale-brown oil.

The 578 parts of the adduct described above are taken up with 1700 parts by volume of benzene, 30 parts of anhydrous sodium acetate are added and the mixture is heated to 35° C. In the course of 30 minutes 555 parts of peracetic acid of 41.3% strength are then added dropwise while maintaining a temperature of 35° C. which is kept up for another 2 hours after the whole of the oxidizing agent has been added dropwise. At first the reaction mixture must be slightly cooled for about 1½ hours and after that this temperature is maintained by heating. After the indicated time the theoretical amount of oxidizing agent has been consumed.

The whole is then cooled and the aqueous phase is separated. The benzene layer is washed three times with 400 parts by volume of water on each occasion, 120 parts of sodium hydroxide solution of 30% strength being added to the third washing water in order to neutralize any remaining acetic acid. The layer is then washed once more with 200 parts by volume of water, the solvent is distilled off under a partial water-jet vacuum and the residue is freed from last remnants of volatile constituents by being heated at 100° C. under 0.1 mm. Hg. In this manner there are obtained 563 parts of a pale-yellow oil which contains 4.18 epoxide equivalents per kg. (95% of the theoretical content) and consists substantially of the compound of the formula

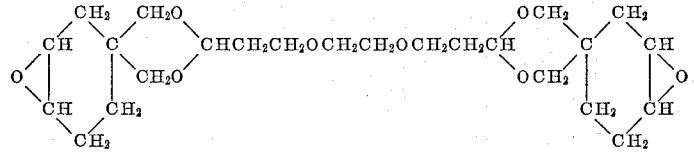

When this oil is hardened with phthalic anhydride (0.7 equivalent of anhydride groups per equivalent of epoxide groups) for 24 hours at 240° C., a slightly tinted, flexible, solid, infusible resin is obtained.

EXAMPLE 16

198 parts of the acetal described in Example 1(a) of acrolein and 1:1-bis-[hydroxymethyl]-cyclohexene-3 are heated with 38 parts of trimethylene glycol to 80° C. and 0.5 part of concentrated sulfuric acid is added, whereupon a slight increase in temperature is observed. As described in Example 15, the reaction mixture is then maintained for 2 hours at 85–90° C., and then treated with 1 part of sodium carbonate, whereupon 18 parts of excess acetal are caused to pass over under a pressure of 0.2 mm. Hg, to leave 210 parts of trimethylene glycol-bis-[2-(2':4'-dioxospiro-5':5')-undecene-9'-yl-(3')-ethyl]-ether in the form of a viscous, yellow oil which is epoxidized by taking it up with 600 parts by volume of benzene, adding 1 part of anhydrous sodium acetate and dropping in 198 parts of 40.7% peracetic acid in the course of 30 minutes at 35° C. After having stirred the mixture for a further 2 hours at 35° C., 97% of the theoretical amount of oxidizing agent have been consumed. Further working up follows the pattern of Example 15, to yield finally 198 parts of a pale-yellow oil containing 3.82 epoxide equivalents per kg. (90% of the theoretical content) which consists substantially of the diepoxide of the formula

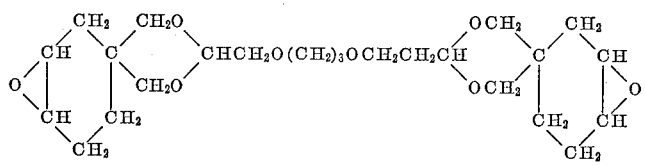

When this product is cured with phthalic anhydride as described in Example 15, a flexible, solid, infusible resin is obtained.

EXAMPLE 17

A mixture of 46 parts of 1:4-butanediol and 200 parts of the acetal described in Example 1(a) of acrolein and 1:1-bis-[hydroxymethyl]-cyclohexene-3 is heated to 80° C., and 0.5 part of concentrated sulfuric acid is added, whereupon the temperature rises slightly. While stirring the mixture thoroughly the temperature is maintained for 2 hours at 85–90° C., at first with slight cooling and after the evolution of heat has subsided by heating. 1 part of anhydrous sodium carbonate is then added and 20 parts of excess acetal are distilled off at 50° C. under 0.3 mm. Hg, which corresponds exactly to the initially added excess. There remain as distillation residue 223 parts of butanediol - bis - [2-(2':4'-dioxospiro-5':5')-undecene - 9' - yl - (3' - ethyl] - ether in the form of a dark, viscous oil.

The latter oil is epoxidized in the following manner: The crude product is taken up in 600 parts by volume of benzene, 10 parts of anhydrous sodium acetate are added and in the course of 30 minutes at 35° C. 196 parts of peracetic acid of 40.8% strength are added dropwise. The oxidation is carried on for another 3 hours and the desired temperature of 35° C. is maintained first by slightly cooling and later on by heating. After the indicated time 98.5% of the theoretical amount of oxidizing agent have been consumed. Further working up is carried out as described in Example 15. After having removed the last traces of volatile constituents in a high vacuum there are obtained in this manner 233 parts of a viscous, yellow liquid which contains 3.95 epoxide equivalents per kg. (94.5% of the theoretical content) and consists substantially of the diepoxide of the formula ture is maintained for 3 hours at 85–90° C. and the reaction mixture is then neutralized with 1 part of anhydrous sodium carbonate. 20 parts of excess acetal are then distilled off in a high vacuum to yield as residue 349 parts of pentanediol - bis - [2 - (2':4' - dioxospiro-5':5') - undecene - 9' - yl - (3) - ethyl] - ether in the form of a dark, viscous liquid.

These 349 parts are taken up in 1050 parts by volume of benzene, treated with 16 parts of anhydrous sodium acetate and epoxidized, as described in Example 15, with 309 parts of peracetic acid of 40.7% strength. Working up is performed as described in Example 15. There are finally obtained 362 parts of a viscous, yellow liquid containing 3.84 epoxide equivalents per kg. (95.3% of the theoretical content).

EXAMPLE 19

A mixture of 198 parts of the acetal described in Example 1(a) of acrolein and 1:1 - bis - [hydroxymethyl] - cyclohexene - 3 and 100 parts of polyethyleneglycol (average molecular weight 200) is heated to 80° C., 1 part of concentrated sulfuric acid is added and the temperature is maintained for 2 hours at 85–90° C.; after neutralization with 1 part of anhydrous sodium carbonate 17 parts of excess acetal are distilled off under 0.2 mm. Hg pressure, to yield as residue 270 parts of a viscous, brown liquid.

Said liquid is taken up in 800 parts by volume of benzene, treated with 10 parts of anhydrous sodium acetate and epoxidized with 198 parts of peracetic acid of 40.8% strength. After washing and concentration there are obtained 273 parts of a viscous, yellow liquid containing 3.24-epoxide equivalents per kg. (95.9% of the theoretical content).

EXAMPLE 20

A mixture of 298 parts of the acetal of acrolein and 1:1-bis-[hydroxymethyl]-cyclohexene-3 and 225 parts of a polyethylene glycol of average molecular weight 300 is heated to 80° C. After addition of 1 part of sulfuric acid and 0.5 part of boron trifluoride etherate (48% strength) no rise in temperature is observed. The temperature is then maintained by heating for 3½ hours at 85–90° C. and the mixture is then neutralized and 23 parts of excess acetal are distilled off, to leave 492 parts of a viscous, brown liquid.

Said liquid is taken up with 1470 parts by volume of

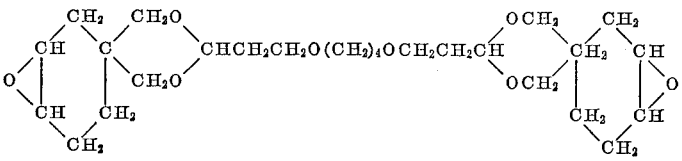

When this product is cured for 24 hours at 140° C. with phthalic anhydride (0.7 equivalent of anhydride groups per equivalent of epoxide groups), a pale-yellow, flexible, solid, infusible resin is obtained.

EXAMPLE 18

A mixture of 87 parts of pentanediol-1:5 and 298 parts of the acetal described in Example 1(a) of acrolein and 1:1 - bis - [hydroxymethyl] - cyclohexane - 3 is heated to 80° C., 1 part of concentrated sulfuric acid is added, whereupon the temperature rises slightly. The temperabenzene, treated with 16 parts of anhydrous sodium acetate and epoxidized with 310 parts of peracetic acid of 40.8% strength for 3 hours at 35° C., whereby 100% of the theoretical amount of oxidizing agent are consumed. After washing, neutralization and concentration there are obtained 418 parts of a viscous, pale-yellow liquid containing 2.84 epoxide equivalents per kg. which, after having been hardened for 24 hours at 140° C. with phthalic anhydride (0.65 equivalent of anhydride groups per equivalent of epoxide groups), forms a flexible, infusible resin.

EXAMPLE 21

A mixture of 279 parts of the acetal of acrolein and 1:1-bis-[hydroxymethyl]-cyclohexene-3 and 319 parts of polypropylene glycol (average molecular weight 425) is heated to 85° C. and treated with 1 part of concentrated sulfuric acid, whereby no heating up occurs. 0.5 part of boron trifluoride etherate of 40% strength is then added, whereupon the temperature rises very slightly and is maintained for 6 hours at 85–90° C. After neutralization with 3 parts of sodium carbonate and distilling off the excess acetal, there remain 586 parts of a viscous, dark liquid.

The latter liquid is taken up in 1500 parts by volume of benzene, treated with 14 parts of anhydrous sodium carbonate and epoxidized with 284 parts of peracetic acid of 44.2% strength. The theoretical amount of oxidizing agent is consumed. After working up as described in Example 15 there are obtained 585 parts of a very viscous, yellow liquid containing 2.17 epoxide equivalents per kg. (89% of the theoretical content).

Curing of this product with phthalic anhydride (one equivalent of anhydride groups per equivalent of epoxide groups) furnishes a very flexible and plastic casting.

EXAMPLE 22

369 parts of the acetal of acrolein and 1:1-bis-[hydroxymethyl]-cyclohexene-3 and 106 parts of transquinitol are heated to 80° C., the quinitol passing only partially into solution. Upon addition of 1 part of sulfuric acid a slight rise in temperature is observed and the remainder of the quinitol dissolves slowly. The temperature is maintained for 3 hours at 90–95° C. and the reaction mixture is then cooled whereupon it crystallizes.

458 parts of the resulting crude mixture are dissolved in 1200 parts by volume of benzene and 20 parts of anhydrous sodium carbonate are added. The mixture is then heated at 35° C. and in the course of 30 minutes 390 parts of peracetic acid of 43.4% strength are added dropwise, whereupon the mixture is stirred on for 2 hours at the same temperature, cooled, the aqueous layer is separated and the benzene layer is worked up as described in Example 15. There are obtained 427 parts of a slightly tinted compound which crystallizes on cooling and contains 3.72 epoxide equivalents per kg. (94.2% of the theoretical content).

When this product is cured for 24 hours at 140° C. with phthalic anhydride (one equivalent of anhydride groups per equivalent of epoxide groups) castings are obtained which have good mechanical properties.

EXAMPLE 23

A mixture of 217 parts of the acetal prepared as described in Example 3(a), consisting of 1:1-bis-[hydroxymethyl]-cyclohexene-3 and crotonic aldehyde, and 31 parts of ethylene glycol is heated to 80° C. and then treated with 2 parts of sulfuric acid, whereupon no heating up occurs. The mixture is then heated on an oil bath to 105° C., whereupon a slightly exothermic reaction sets in. The temperature is maintained for a further 2 hours at 105° C., whereupon 2 parts of sodium carbonate are added and 15 parts of excess acetal are distilled off, to leave 227 parts of a viscous, dark liquid.

The latter liquid is taken up with 660 parts by volume of benzene, treated with 18 parts of anhydrous sodium carbonate and epoxidized with 216 parts of peracetic acid of 39.5% strength as described in Example 15. Working up as described in Example 15 yields 211 parts of a very viscous, orange-colored liquid containing 3.75 epoxide equivalents per kg. (90.5% of the theoretical content).

EXAMPLE 24

A mixture of 276 parts of the acetal of acrolein and 1:1-bis-[hydroxymethyl]-cyclohexene-3 and 225 parts of dihydrodicyclopentadienol-8 is heated to 85° C. and 0.5 part of sulfuric acid of 98% strength is added, whereupon the temperature rises spontaneously. The temperature is maintained for 24 hours at 90° C., at first by cooling and then by heating. The resulting adduct is then epoxidized in the following manner:

The adduct is treated with 1350 parts of benzene and 35 parts of sodium acetate and then heated to 35° C. In the course of 30 minutes 576 parts of peracetic acid of 43.6% strength are then added. The temperature is maintained for another 2½ hours at 35° C., at first by cooling and then by heating. The product is then washed, neutralized and concentrated as described in Example 1(c), to yield finally 505 parts of a viscous, yellow liquid containing 5.15 epoxide equivalents per kg. (93.3% of the theoretical content) which consists substantially of the compound of the formula

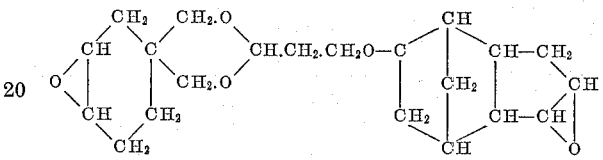

The latter product is cured with phthalic anhydride (0.7 equivalent of anhydride groups per equivalent of epoxide groups) for 24 hours at 140° C., to form a bright, yellow, infusible resin having a thermal stability of 180° (Martens, DIN) and possessing good mechanical properties.

EXAMPLE 25

A mixture of 268 parts of octadecenyl alcohol and 186 parts of the acetal described in Example 1(a) of acrolein and 1:1-bis-[hydroxymethyl]-cyclohexene-3 is heated to 85° C. and 0.5 part of sulfuric acid of 98% strength is added, whereupon slight heating up occurs. The temperature is maintained for 3 hours at 90° C. 1 part of sodium carbonate is then added and the mixture is heated to 110° C. under 0.2 mm. Hg which causes no distillation. The adduct obtained in this manner is a viscous, yellow liquid.

The latter product is epoxidized in the following manner: 1150 parts of benzene and 20 parts of sodium acetate are added and the mixture is heated to 35° C., whereupon within 20 minutes 384 parts of peracetic acid of 43.5% strength are added; the temperature is then maintained for 2½ hours at 35° C., after which time the theoretical amount of oxidizing agent has reacted. The product is washed, neutralized and concentrated at a final temperature of 115° C. under 0.1 mm. Hg. There are obtained 458 parts of a viscous, yellow liquid containing 3.64 epoxide equivalents per kg. When this product is cured for 24 hours at 140° with phthalic anhydride (0.7 equivalent anhydride groups per equivalent of epoxide groups) it forms a bright, yellow, flexible and infusible resin.

EXAMPLE 26

A mixture of 22.5 parts of water and 450 parts of the acetal described in Example 1(a) of acrolein and 1:1-bis-[hydroxymethyl]-cyclohexene-3 is heated to 80° C. and then treated with 3.5 parts of para-toluenesulfonic acid, whereupon the temperature rises slightly and the reaction mixture begins to boil under reflux. The boiling point rises gradually and reaches after 5 hours 90° C. at a bath temperature of 102° C. At this point the bulk of the water has reacted. The acid is then neutralized with 5 parts of sodium carbonate, and 3 parts of water and 4 parts of unreacted acetal are distilled off, to leave 461 parts of bis-[2-2':4'-dioxospiro-5':5')-undecene-9'-yl-(3')-ethyl]-ether in the form of a dark oil. Determination of the content of double bonds by hydrogenation reveals 98.5% of the theoretical content.

566 parts of the resulting unsaturated ether acetal are taken up in 1530 parts of benzene, 35 parts of sodium acetate are added and the mixture is heated to 35° C. and then treated within 30 minutes with 580 parts of peracetic acid of 43.2% strength. The temperature is maintained for 2½ hours at 35° C., at first by cooling and then by heating. The aqueous layer is separated and the benzene layer is washed, neutralized and concentrated as described in Example 1, to yield 420 parts of a highly viscous, yellow product containing 4.40 epoxide equivalents per kg. and consisting substantially of the diepoxide of the formula

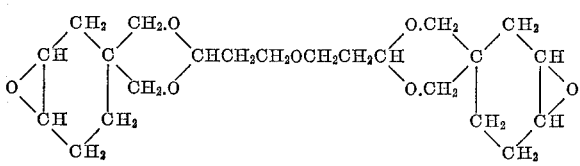

After having been cured with phthalic anhydride (0.6 equivalent of anhydride groups per equivalent of epoxide groups) for 24 hours at 170° C. it forms a bright, infusible resin having very good mechanical properties.

EXAMPLE 27

A mixture of 90 parts of 3-vinyl-2:4-dioxospiro(5:5)-undecene-9 (acetal from Δ³-cyclohexene-1:1-dimethanol and acrolein), 90 parts of the Diels-Alder adduct of 1:4-butanediol with hexachlorocyclopentadiene and 0.5 part by volume of concentrated sulfuric acid is heated for 4 hours at 80° C. The solid Diels-Alder adduct slowly dissolves. When the reaction is complete, a highly viscous liquid is obtained which does not contain any starting material.

The so-obtained product is dissolved in 430 parts of benzene and, after the addition of 5 parts of anhydrous sodium acetate, epoxidized with 87 parts of peracetic acid of 43.6% strength at 35° C. as described in the preceding examples. The reaction requires for completion 3 hours at 35°C. The oxidated reaction product is worked up in an analogous manner to that described in the preceding examples. There are obtained 152 parts of a product crystallized in the cold which contains 2.1 epoxide equivalents per kg. and which consists chiefly of the diepoxide of the formula

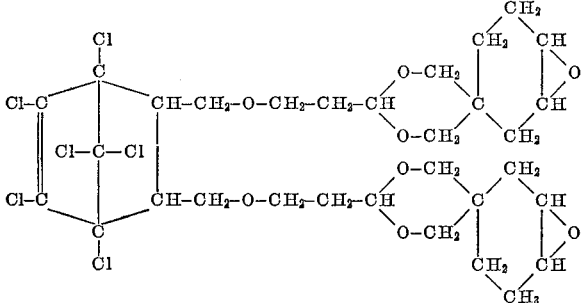

The product can be cured with an acid anhydride, such as phthalic anhydride, to form sparingly combustible or incombustible castings.

EXAMPLE 28

A mixture of 630 parts of 3-vinyl-2:4-dioxo-spiro-(5:5)-undecene-9, 434 parts of ethylene glycol and 4 parts of paratoluene sulfonic acid is heated for 90 minutes at 90° C. The mixture is then cooled, the acid is neutralized with 5 parts of anhydrous Na₂CO₃ and the reaction product subjected to tractional distillation. There are obtained at 52-94° C. under 0.15 mm. of pressure of mercury 260 parts of unreacted ethylene glycol, at 125-130° C. under 0.15 mm. of pressure of mercury 500 parts of unsaturated alcohol (3-hydroxyethoxyethyl-2:4-dioxospiro-(5:5)-undecene-9) and as residue 230 parts of the addition product of 2 moles of acetal and 1 mol of ethylen glycol.

The resulting unsaturated alcohol is converted into the corresponding chlorhydrin as follows:

363 parts of the above described 3-hydroxyethoxyethyl-2:4-dioxospiro-(5:5)-undecene-9 and 1 part of borontrifluoride etherate of 40% strength are heated at 80° C. 153 parts of epichlorhydrin are added dropwise in the course of 15 minutes to the well stirred mixture, care being taken that a temperature of 80-85° C. is maintained, if necessary by cooling. Stirring is then continued at the same temperature for 30 minutes. At the end of this time no unreacted starting material is detectable. 515 parts of a viscous yellow liquid are obtained.

The resulting chlorhydrin is epoxidized as follows: The resulting 515 parts of chlorhydrin are dissolved in 1390 parts of benzene, 20 parts of anhydrous sodium acetate are added and 219 parts of peracetic acid of 43.2% strength are added dropwise in the course of 30 minutes at 35° C. with cooling. Stirring is continued for 3 hours. The aqueous layer is then separated, the organic phase washed and neutralized and the solvent evaporated in an analogous manner to that described in the preceding examples. There are obtained 486 parts of a yellow viscous liquid containing 2.63 epoxide equivalents per kg. (92% of the theoretical yield).

The resulting reaction product is then dehydrohalogenated as follows:

479 parts of the resulting epoxidized product are vigorously stirred with 365 parts of sodium hydroxide solution of 30% strength for 1½ hours at 50-55°C. 800 parts of benzene are then added, the aqueous layer is separated and the benzene distilled off from the organic layer under reduced pressure, the vacuum being increased to 0.1 mm. pressure of mercury at 100° C. temperature of the bottom product. There are finally obtained 403 parts of a pale yellow mobile liquid containing 5.5 epoxide equivalents per kg. (86.5% of the theoretical yield) which consists chiefly of the diepoxide of the formula

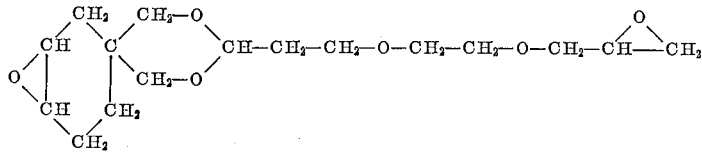

Diepoxide with similar properties are obtained, when in the above Example 28 the 434 parts of ethylene glycol are replaced by an equivalent amount of diethylene glycol, triethylene glycol, polyethylene glycol, polypropylene glycol, 1,3-propylene glycol, 1,4-butanediol 1,5-pentane diol or 1,6-hexanediol.

What is claimed is:
1. A diepoxy compound of the formula

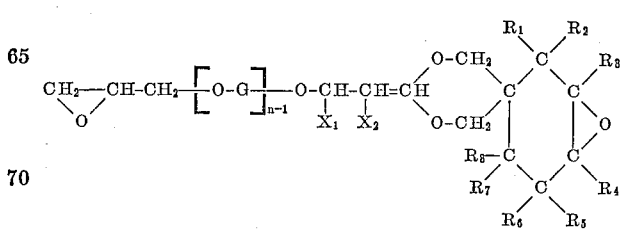

in which $X_1$ represents a member selected from the class consisting of hydrogen atom and the methyl group, $X_2$ is hydrogen and in which $R_1$ and $R_5$ are selected from the group consisting of hydrogen, halogen, lower alkyl, and together $R_1$ and $R_5$ form the methylene group, $R_2$, $R_3$, $R_4$, $R_6$, $R_7$ and $R_8$ each represents a member selected from the class consisting of a hydrogen atom, a halogen atom and lower alkyl, G is the divalent hydrocarbon obtained by removing the terminal hydroxyl groups from an aliphatic saturated dialcohol with two to six carbon atoms, and $n$ is an integer of at least 1 and at the most 2.

2. The diepoxide of the formula

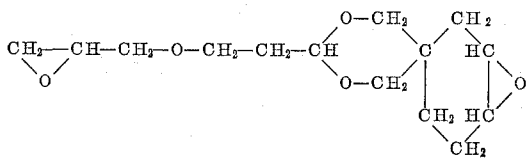

3. The diepoxide of the formula

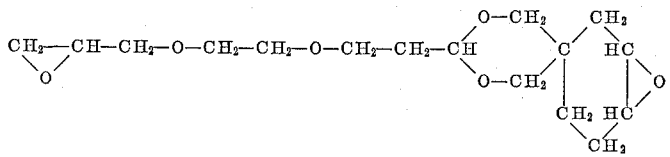

No references cited.

WALTER A. MONDANCE, *Primary Examiner.*

CERTIFICATE OF CORRECTION

Patent No. 3,210,375                                October 5, 1965

Daniel Porret et al.

It is hereby certified that error appears in the above numbered patent requiring correction and that the said Letters Patent should read as corrected below.

Column 1, line 42, for "groups" read -- group --; line 69, for "1:2 epoxide" read -- 1:2-epoxide --; column 2, line 35, for "trimethylcyclohexne-" read -- trimethylcyclohexene- --; column 4, lines 7 and 35, for "wtih", each occurrence, read -- with --; columns 7 and 8, formula XVI, the extreme left-hand portion of the formula should appear as shown below instead of as in the patent:

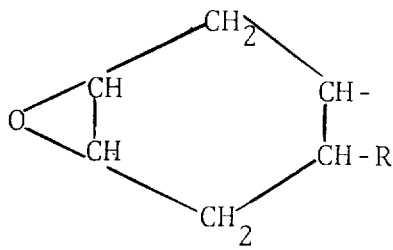

column 12, line 21, for "bis[hydroxymethyl]-", in italics, read -- bis-[hydroxymethyl]- --, in italics; line 55, for 3[Δ$^3$-tetrahydro-" read -- 3-[Δ$^{3'}$-tetrahydro- --; column 13, line 45, for "39.9%" read -- 39.5% --; column 14, lines 32 to 38, the extreme right-hand portion of the formula should appear as shown below instead of as in the patent:

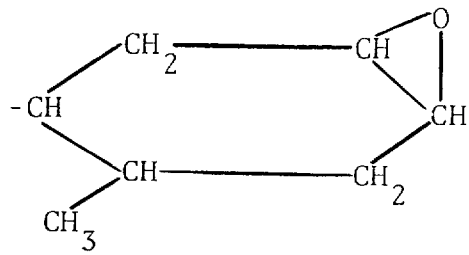

same column 14, line 62, for "dropwise." read -- dropwise, --; column 18, line 18, for "550 C." read -- 55° C. --; column 19, line 39, for "(3'-" read -- (3')- --; columns 19 and 20, lines 58 to 62, the extreme right-hand portion of the formula should appear as shown below instead of as in the patent:

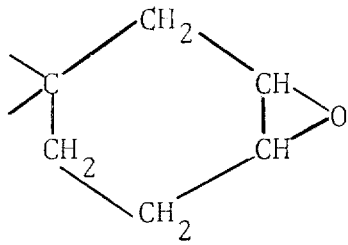

column 22, lines 17 to 23, the last portion of the formula should appear as shown below instead of as in the patent:

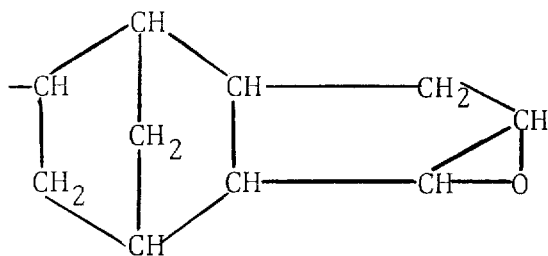

column 24, line 2, for "tractional" read -- fractional --; same column 24, lines 59 to 71, for that portion of the formula reading

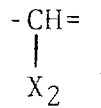     read     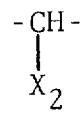

Signed and sealed this 21st day of June 1966.

(SEAL)
Attest:

ERNEST W. SWIDER
Attesting Officer

EDWARD J. BRENNER
Commissioner of Patents